United States Patent [19]

Johnson

[11] 4,343,448

[45] Aug. 10, 1982

[54] ALL RADIAL CONSTRUCTION FOR CONTINUOUS RIBBON PARACHUTES

[75] Inventor: Donald W. Johnson, Albuquerque, N. Mex.

[73] Assignee: The United States of America as represented by the Secretary of the Air Force, Washington, D.C.

[21] Appl. No.: 126,074

[22] Filed: Feb. 29, 1980

[51] Int. Cl.³ .............................................. B64D 17/10
[52] U.S. Cl. ..................................................... 244/145
[58] Field of Search ............................... 244/145, 142

[56] References Cited

U.S. PATENT DOCUMENTS

| | | | |
|---|---|---|---|
| 3,173,636 | 3/1965 | Sepp, Jr. | 244/145 |
| 3,452,951 | 7/1969 | Wilson | 244/145 |
| 3,927,850 | 12/1975 | Rychnovsky | 244/145 |

FOREIGN PATENT DOCUMENTS 888370  8/1953  Fed. Rep. of Germany ...... 244/145

Primary Examiner—Galen L. Barefoot
Attorney, Agent, or Firm—Donald J. Singer; Arsen Tashjian

[57] ABSTRACT

A continuous ribbon parachute construction including a series of substantially triangular gores having a plurality of parallel arcuate horizontal ribbons which are joined to make up a circle whose center is on the axial center of the parachute. Each side edge of each gore includes a full radial strip therealong which, if extended upward, would intersect at the center of the chute canopy. A series of mini-radials extending part way up the gore from the base are positioned between the full radials. A fixture is provided for assembling the parachute by placing the horizontals across the fixture and the full radials and mini-radials along the fixture for attachment in their proper relationship to each other.

1 Claim, 5 Drawing Figures

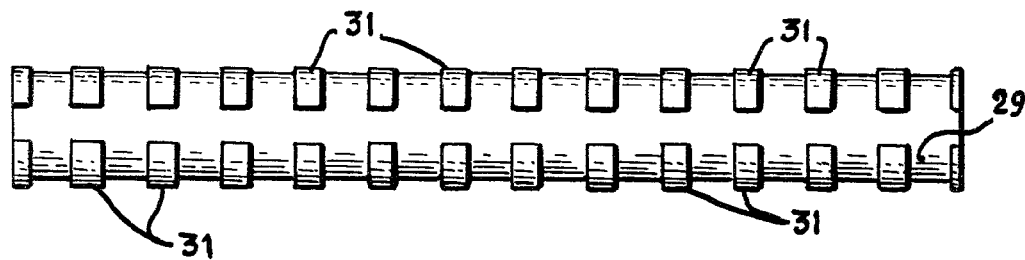
FIG. 3-A
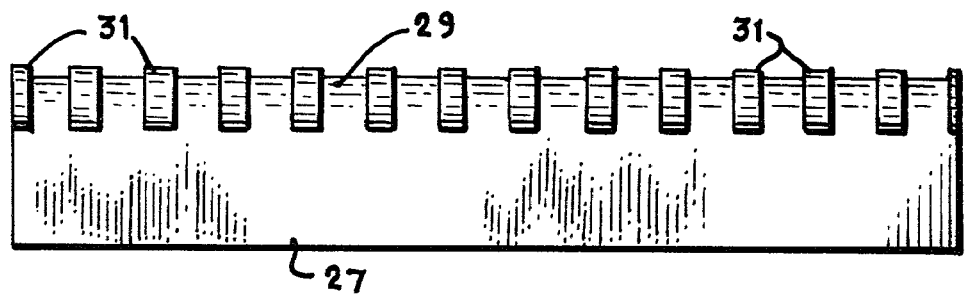
FIG. 3-B
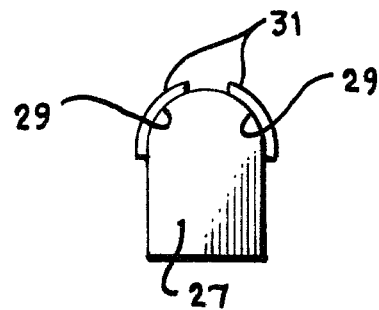
FIG. 3-C

4,343,448

ALL RADIAL CONSTRUCTION FOR CONTINUOUS RIBBON PARACHUTES

STATEMENT OF GOVERNMENTAL INTEREST

The invention described herein may be manufactured and used by or for the Government for governmental purposes without the payment of any royalty thereon.

BACKGROUND OF THE INVENTION

This invention relates to a continuous ribbon parachute construction and, more particularly, the invention is concerned with providing a continuous ribbon parachute construction having maximum parachute symmetry which in turn minimizes the number of local stress concentrations. The vertical tapes on the conventional continuous ribbon parachute as replaced by a series of mini-radials thereby eliminating certain bulky and hard-to-sew joints. A fixture for assembling the chute is also provided.

Conventional continuous ribbon parachutes are generally constructed in a series of substantially triangular gores which include a plurality of parallel horizontal ribbons with radially disposed tapes along the side edges of each gore for holding the horizontals in spaced parallel relationship. A series of spaced apart parallel vertical tapes are provided for controlling the position of the horizontals in the area between the radials. The vertical tapes join the radials at an angle at the side edges of the gore. Since, by necessity, the horizontal ribbons of a continuous ribbon parachute must be perpendicular to the radials which are the main load carrying part of the structure, fullness must be allowed on one edge of the horizontal ribbon to insure that the horizontal ribbons are perpendicular to both the radials and the verticals. This is difficult to accomplish accurately during the layout and basting of the horizontal ribbon/radial joints and, as a result, the joints are frequently not exactly perpendicular causing unwanted tearing stresses on the horizontal ribbons. In addition, each of the intersections of a vertical with a radial causes a bulky and hard-to-sew joint that changes the elongation characteristics of the radial in that area. These problems are magnified when low elongation materials, such as Kevlar, are used for chute construction.

SUMMARY OF THE INVENTION

The present invention is concerned with providing a new type of continuous ribbon parachute that solves the problems noted above which arise from constructing ribbon chutes by prior methods. The basic gore configuration includes radials and mini-radials which, if extended, intersect at the center of the canopy and the horizontal ribbons are represented by circles whose center is the center of the chute. The centerline of all of the radials is perpendicular to the tangent of the horizontal ribbon centerline. Since the radials and mini-radials never intersect, it is obvious that the difficulties that a conventional continuous ribbon chute has with the radial-vertical intersections are eliminated.

Accordingly, it is an object of the invention to provide a construction for a continuous ribbon parachute having a plurality of gores with each of the gores having mini-radials in place of the vertical tapes found on conventional continuous ribbon parachutes.

Another object of the invention is to provide on all radial construction for continuous ribbon parachutes wherein the parallel horizontal ribbons on a conventional parachute are replaced by parallel arcuate ribbons so that the centerline of all of the radials is perpendicular to the tangent of the horizontal (arcuate) ribbon centerline.

Still another object of the invention is to provide an all radial continuous ribbon parachute construction wherein the intersection of the verticals with the radials is eliminated to that no bulky and hard-to-sew joints are present which would change the elongation characteristics of the radial in that area.

A further object of the invention is to provide a new type of continuous ribbon parachute which is easier to construct and which reduces stress concentrations in critical areas by maximizing parachute symmetry.

A still further object of the invention is to provide a fixture for constructing a continuous ribbon parachute which includes a series of spaced blocks attached to the curved upper surface of an elongated outwardly extending beam cantilevered from a pedestal or table. The horizontal ribbons are draped over the beam between the blocks and a radial tape is placed along the top center of the beam between the blocks and basted to the horizontals. The mini-radials can be joined to the horizontals in a similar manner or an automatic sewing machine can be used to complete the sewing of these members.

These and other objects, features and advantages will become more apparent after considering the following detailed description taken in conjunction with the annexed drawings and appended claims.

BRIEF DESCRIPTION OF THE DRAWINGS

FIG. 3A is a top view of a fixture suitable for use during assembly of the all radial ribbon parachute according to the invention;

FIG. 3B is a side view of the fixture shown in FIG. 3; and

FIG. 3C is an end view of the fixture showing the position of the location blocks on the top portion thereof.

DESCRIPTION OF THE PREFERRED EMBODIMENT

Figure 1:
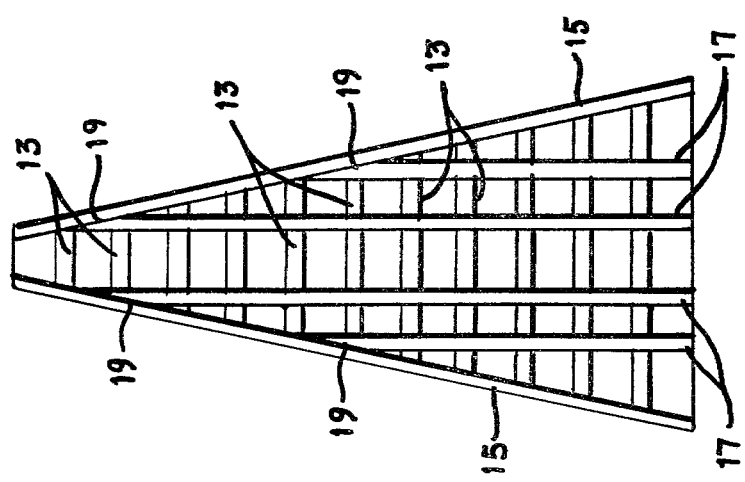
FIG. 1 is a front elevation of a gore pattern of a prior art continuous ribbon parachute showing the vertical tapes intersecting the radials at an angle.

Referring now to the drawings, FIG. 1 shows a prior art continuous ribbon parachute gore pattern. Each gore of the parachute includes a series of continuous ribbons 13 which are horizontally oriented. The longer sections of ribbon 13 are at the lower end of the gore while the shorter ribbons 13 are at the top of the gore. Radial tapes 15 are attached by sewing along the ends of the horizontal ribbons 13 maintaining them in a fixed spaced parallel relationship to one another. A series of vertical tapes 17 are also used to control the position of the horizontal ribbons 13. These vertical tapes 17 intersect the radials 15 at an angle and since, by necessity, the horizontal ribbons 13 of a continuous ribbon parachute must be perpendicular to the radials 15 which are the main load carrying part of the structure, fullness must be allowed on one edge of the horizontal ribbon 13 to allow the horizontals 13 to be perpendicular to both the radials 15 and the verticals 17. This is difficult to accomplish accurately during layout and basting of the horizontal ribbon 13 and radial 15 joints with the result that the joints are frequently not exactly perpendicular which causes unknown tearing stress on the horizontal ribbons 13. In addition, the intersection 19 of the vertical 17 with the radial 15 causes a bulky and hard to sew joint that changes the elongation characteristics of the radial 15 in that area 19. These problems are magnified when low elongation materials such as Kevlar are used for chute construction.

Figure 2:
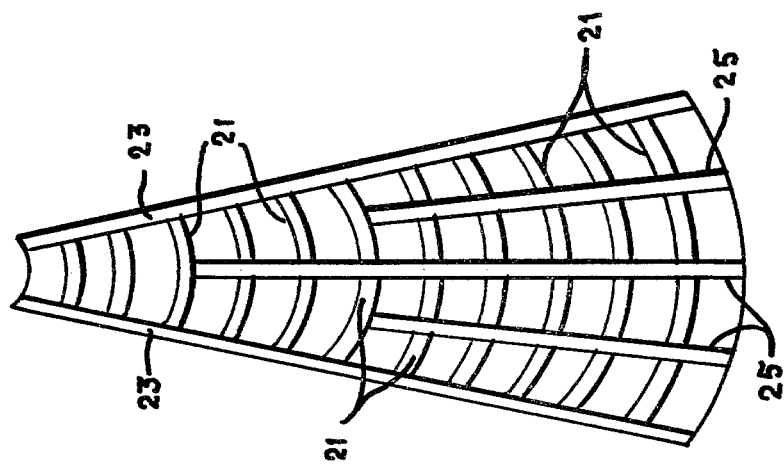
FIG. 2 is a front elevation of a gore pattern of a continuous ribbon parachute according to the invention showing the mini-radials positional between the radials.

In the basic gore configuration shown in FIG. 2, the new type of continuous ribbon parachute is illustrated. The horizontal ribbons 21 are represented by circles whose center is the center of the chute. The radials 23 along with the mini-radials 25, if extended, intersect at the center of the canopy. With this type of construction, the centerline of all the radial members 23 and 25 will be perpendicular to the tangent of the centerline of the horizontal ribbons 21 which are arcuate in configuration. Also, it is obvious that the radials 23 and mini-radials 25 will never intersect and cause the difficulties that a conventional continuous ribbon chute (as shown in FIG. 1) has with the radial-vertical intersections. This type of construction maximizes parachute symmetry thereby minimizing the number of local stress concentrations.

In constructing a parachute of the type shown in FIG. 2, the location of each radial 23 and each mini-radial 25 is marked on each horizontal ribbon 21. A fixture such as that shown in FIGS. 3A, 3B and 3C can be used for the assembly of this type of parachute. The fixture includes an outwardly extending cantilevered beam 27 having a curved upper surface 29 with a series of curved spaced blocks 31 fixedly attached thereto. The continuous horizontal ribbons 21 are placed across the fixture in the spaces between the blocks 31 and a radial member 23 is placed lengthwise along the beam 27 between the blocks 31 over the ribbons 21 which can then be basted in place. The blocks 31 are attached to the fixture to insure accurate placement of each component. The fixture is cantilevered from a pedestal or a table so that the horizontal ribbons 21 are free to hang beneath the fixture. The joints between the mini-radials 25 and the horizontal ribbons 21 can be basted in the same manner as above or an automatic sewing machine can be used to complete the sewing of these members.

Although the invention has been illustrated in the accompanying drawings and described in the foregoing specification in terms of a preferred embodiment thereof, the invention is not limited to this embodiment or to the particular configuration shown. It will be apparent to those skilled in the art that certain changes, modifications and substitutions can be made, particularly with respect to the number and position of the mini-radials without departing from the true spirit and scope of the appended claims.

Having thus set forth the nature of my invention, what I claim and desire to secure by Letters Patent of the United States is:

1. A continuous ribbon parachute comprising a canopy having a plurality of continuous horizontal ribbons, each of said ribbons being represented by circles, the center of each of said circles being the center of said parachute, said ribbons being of gradually decreasing diameter from the base of said parachute to the center of said parachute, a plurality of adjacent tapes each fully extending radially between said base and said center of said parachute and wherein each pair of said adjacent radially extending tapes define therebetween a substantially triangular-shaped gore thereby forming a plurality of gores within said parachute, three equally spaced adjacent mini-tapes within each of said gores, each of said three mini-tapes extending radially part way between said base and said center of said parachute, a central mini-tape of said three adjacent mini-tapes extending farther upward toward said center of said parachute than the other two adjacent mini-tapes, and said ribbons being fixedly secured at a plurality of points thereon to said radially extending tapes and said radially extending mini-tapes such that the centerlines of said radially extending tapes and said radially extending mini-tapes are perpendicular to the tangent of the centerline of said horizontal ribbons at said points of securement thereby maximizing parachute symmetry and minimizing the number of local stress concentrations therein.

* * * * *